(12) United States Patent
Stoffer et al.

(10) Patent No.: US 7,241,371 B2
(45) Date of Patent: Jul. 10, 2007

(54) ADDITIVE-ASSISTED, CERIUM-BASED, CORROSION-RESISTANT E-COATING

(75) Inventors: James O. Stoffer, Rolla, MO (US); Thomas J. O'Keefe, Rolla, MO (US); Eric L. Morris, Irvine, CA (US); Xuan Lin, Northford, CT (US); Scott A. Hayes, Arnold, MO (US); Pu Yu, Rolla, MO (US)

(73) Assignee: The Curators of University of Missouri, Columbia, MO (US)

( * ) Notice: Subject to any disclaimer, the term of this patent is extended or adjusted under 35 U.S.C. 154(b) by 799 days.

(21) Appl. No.: 10/344,655

(22) PCT Filed: Aug. 17, 2001

(86) PCT No.: PCT/US01/25743

§ 371 (c)(1), (2), (4) Date: Aug. 6, 2003

(87) PCT Pub. No.: WO02/14586

PCT Pub. Date: Feb. 21, 2002

(65) Prior Publication Data

US 2004/0026261 A1    Feb. 12, 2004

Related U.S. Application Data

(60) Provisional application No. 60/225,885, filed on Aug. 17, 2000.

(51) Int. Cl.
    C25D 13/10    (2006.01)
(52) U.S. Cl. .................. 204/489; 204/500; 204/510
(58) Field of Classification Search ........... 204/489, 204/500, 510
    See application file for complete search history.

(56) References Cited

U.S. PATENT DOCUMENTS

| | | | |
|---|---|---|---|
| 4,601,916 A * | 7/1986 | Arachtingi .............. 204/479 |
| 5,192,374 A | 3/1993 | Kindler |
| 5,221,371 A | 6/1993 | Miller |
| 5,362,335 A | 11/1994 | Rungta |
| 5,587,059 A * | 12/1996 | Yamoto et al. ......... 204/505 |
| 5,866,652 A | 2/1999 | Hager et al. |
| 5,932,083 A | 8/1999 | Stoffer et al. |
| 5,964,928 A | 10/1999 | Tomlinson |
| 6,139,610 A | 10/2000 | Sinko |
| 6,190,780 B1 | 2/2001 | Shoji et al. |
| 6,200,672 B1 | 3/2001 | Tadokoro et al. |
| 6,248,184 B1 | 6/2001 | Dull et al. |
| 6,306,276 B1 | 10/2001 | Nobe et al. |
| 6,312,812 B1 | 11/2001 | Hauser et al. |
| 6,531,043 B1 * | 3/2003 | Palaika .................. 204/484 |
| 6,716,370 B2 | 4/2004 | Kendig |
| 2002/0003093 A1 | 1/2002 | Dull et al. |
| 2003/0024432 A1 | 2/2003 | Chung et al. |
| 2003/0044515 A1 | 3/2003 | Sandhage |
| 2003/0221590 A1 | 12/2003 | Sturgill |
| 2003/0230363 A1 | 12/2003 | Sturgill et al. |
| 2003/0234063 A1 | 12/2003 | Sturgill et al. |
| 2004/0005478 A1 | 1/2004 | Kendig et al. |
| 2004/0011252 A1 | 1/2004 | Sturgill et al. |
| 2004/0016363 A1 | 1/2004 | Phelps et al. |
| 2004/0016910 A1 | 1/2004 | Phelps et al. |
| 2004/0020568 A1 | 2/2004 | Phelps et al. |
| 2004/0026260 A1 | 2/2004 | Stoffer et al. |
| 2004/0026261 A1 | 2/2004 | Stoffer et al. |
| 2004/0104377 A1 | 6/2004 | Phelps et al. |
| 2004/0175587 A1 | 9/2004 | Kendig |
| 2004/0186201 A1 | 9/2004 | Stoffer et al. |
| 2004/0249023 A1 | 12/2004 | Stoffer et al. |
| 2004/0249043 A1 | 12/2004 | Stoffer et al. |

FOREIGN PATENT DOCUMENTS

| | | |
|---|---|---|
| JP | 55/065326 A | 5/1980 |
| WO | WO 88/06639 | 9/1988 |
| WO | WO 02/14586 A1 | 2/2002 |

OTHER PUBLICATIONS

Aldykiewicz, Jr., et al., Studies of the Formation of Cerium Rich Protective Films Using X-Ray Absorption Near-Edge Spectroscopy and Rotating Disk Electrode Methods, J. Electrochem, Soc., vol. 143, No. 1, Jan. 1996, pp. 147-153.

Hinton, et al., Cerium Conversion Coatings for the Corrosion Protection of Aluminum, Materials Forum, vol. 9, No. 3, 1986, pp. 162-173.

Hinton, et al., Cerium Oxide Coatings for Corrosion Protection of Aluminum Alloys, Materials Australasia, Jan./Feb. 1987, pp. 18-20.

(Continued)

*Primary Examiner*—Kishor Mayekar
(74) *Attorney, Agent, or Firm*—Senniger Powers (57) ABSTRACT

Corrosion resistance of metallic components such as stainless steel components of vehicles, and especially aluminum-based components of aircraft, is enhanced by application of an e-coat paint or primer which is enhanced by incorporation of cerium ions into the e-coat electrolytic bath. The resulting overall coating includes a cerium-based layer under a cerium-enhanced e-coat paint or primer layer.

11 Claims, 7 Drawing Sheets

OTHER PUBLICATIONS

Aldykewicz, Jr., et al., The Investigation of Cerium as a Cathiodic Inhibitor for Aluminum-Copper Alloys, J. Electrochem Soc., vol. 142, No. 10, Oct. 1995, pp. 3342-3350.

Davenport, et al., Xanes Investigation of the Role of Cerium Compounds as Corrosion Inhibitors for Aluminum, Corrosion Science, vol. 32, No. 5/6, pp. 653-663, 1991.

Weiser, The Hydrous Oxides, McGraw-Hill Book Company, Inc., 1926, pp. 253-259.

Hinton, et al., The Inhibition of Aluminum Alloys Corrosion by Cerous Cations, Metals Forum, vol. 7, No. 4, 1984, pp. 211-217.

Mansfeld et al., Corrosion Protection of Al Alloys and Al based Metal Matrix, Corrosion 88, Mar. 21-25, 1988 paper 380, NACE.

Davenport et al., X-Ray Absorption Study of Cerium in the Passive Film on Aluminum, J. Electrochem Soc., vol. 136, No. 6, Jun. 1989, pp. 1837-1838.

Hinton, New Approaches to Corrosion Inhibition with Rare Earth Metal Salts, Corrosion 89, Apr. 17-21, 1989, paper 170, NACE.

Hinton, et al., The Corrosion Inhibition of Zinc with Cerous Chloride, Corrosion Science, 29, 1989, pp. 967-984.

Hinton, Corrosion Inhibition with Rare Earth Metal Salts, Journal of Alloys and Compounds, 180, 1992, pp. 15-25.

Morris, et al., Evaluation of Non-Chrome Inhibitors for Corrosion Protection of High-Strength Aluminum Alloys, Polymeric Materials Science and Engineering, vol. 81, New Orleans, LA, Aug. 22-26, 1999.

Stoffer, et al., Environmentally Compliant Non-Chromate Conversion Coatings for Aluminum, International Waterborne, High-Solids, and Powder Coatings Symposium, New Orleans, LA, Feb. 10-12,1999.

Morris, et al., The Use of Inhibitors to Improve the Corrosion Protection of E-Coat Systems on Aluminum Alloys: A Combined Electrochmical and Neutral Salt Spray Evaluation, Polymeric Materials Science and Engineering, vol. 78, Mar. 29-Apr. 2, 1998.

Fujita et al., "Fabrication of Co-Ce-O Films By Metal-Oxide Co-Electrodeposition Method From Reaction Solution Including a Complexing Agent", Nippon Oyo Jiki Gakkaishi (no month, 2001), vol. 25, No. 4-2, pp. 883-886 (Abstract only).

\* cited by examiner

1. CrCC 7075 T-6
2. Chromated Control Primer
3. Chromate Inhibitor
4. 2.5 mm Corrosion Migration

1. CrCC 7075 T-6
2. Commercial E-Coat
3. Cerium Nitrate Inhibitor
4. 0.2 mm Corrosion Migration

| 1. Chromated Al 7075 T-6 |
| 2. E-Coat + Commercial Inhibitor |
| 3. 6.0 mm Corrosion Migration |

| 1. Chromated Al 7075 T-6 |
| 2. E-Coat + UMR's Cerium Inhibitor |
| 3. 1.1 mm Corrosion Migration |

ADDITIVE-ASSISTED, CERIUM-BASED, CORROSION-RESISTANT E-COATING

REFERENCE TO RELATED APPLICATION

This application is a 35 U.S.C. 371 National Stage filing of PCT/US01/25743 on Aug. 17, 2001, which claims the benefit of U.S. Provisional Application Ser. No. 60/225,885 filed Aug. 17, 2000.

This invention was made with government support under grant number AFOSRF49620-96-0140 awarded by the United States Air Force. The government has certain rights in the invention.

BACKGROUND OF THE INVENTION

This invention relates to a method for enhancing the corrosion resistance of metallic components, especially steel, galvanized steel, aluminum, and aluminum alloys, by deposition of a cerium-based coating thereon. The invention has particular application for aerospace structural components such as aircraft skin, wing skin and other sheet components manufactured from aluminum or aluminum alloys, especially sheet and bulk structural pieces, or in other applications where long-term corrosion resistance is desired.

Many aerospace components are constructed from aluminum or aluminum alloys due to their superior strength to weight ratio. Aluminum and aluminum alloys, however, are subject to corrosion upon exposure to water condensed from humid air and contaminated from other sources with salt, rain, snow, ocean salt, salt applied to runways, and other environmental conditions, which can lead to catastrophic failure. Many steel and galvanized steel components used in the aircraft, automobile, and other industries are also exposed to such conditions. Aluminum corrosion is an electrochemical process involving dissolution of metal at anodic sites according to the reaction $Al \rightarrow Al^{3+}+3e^-$. At cathodic sites the reduction of oxygen and evolution of hydrogen occur according to the reactions $O_2+2H_2O+4e^- \rightarrow 4OH^-$ and $2H^++2e^- \rightarrow H_2$. Corrosion inhibition is accomplished by reducing the rates at which these reactions occur.

Heretofore the corrosion resistance of aluminum and aluminum alloys has been enhanced by the use of chromate conversion coatings. A conversion coating is a coating consisting of metallic salts, such as chromate, which form during and after dissolution of a metallic element, such as chromium or aluminum, or are precipitated from salts onto a substrate. A disadvantage of chromate coatings, however, is their toxicity, as ingestion or inhalation of chromates has been determined to cause kidney failure, liver damage, blood disorders, lung cancer and eventually death. Chromium is among the Environmental Protection Agency's leading toxic substances since in its hexavalent form it is a known carcinogen and is environmentally hazardous as a waste product. Many of the major environmental laws which are in force today unfavorably impact the use of chromate materials and processes. OSHA (Occupational Safety & Health Administration) requirements permit only 1 µg/m³ of insoluable chromate in the air space per 10 hour day. The chromating processes generate large volumes of hazardous wastes. Due to the health risks and inevitable government regulation associated with the application of chromate materials and their disposal, there has been a worldwide research effort to develop alternative coatings which are technically equivalent but do not pose an environmental risk.

Corrosion resistance has also been enhanced by anodizing. However, anodizing is known to cause fatigue problems leading to failure of aluminum components.

The effectiveness of cerium salts (along with other rare-earth salts) as a potential replacement to chromates for aluminum alloys was demonstrated in 1984 by Hinton et al. at the Aeronautical Research Laboratory of Australia. Hinton et al. found that after immersing an aluminum alloy in a solution containing cerium chloride for several days, a yellowish film was formed which provided significant corrosion protection for the alloy upon subsequent exposure to NaCl solution. Over the decade, cerium salts have attracted attention as an effective corrosion inhibitor because they are not toxic and are relatively inexpensive.

The degree of protection provided to the aluminum strongly depended on the time of immersion in the $CeCl_3$ solution. To achieve significant protection, an immersion time of at least 100 hours was generally required, which makes this process commercially unattractive. Further studies by Hinton et al. have shown that the cerium-containing films could be produced cathodically by polarizing an aluminum alloy specimen in 1000 ppm $CeCl_3$ aqueous solution for 30 minutes. However, this cathodic coating was inhomogeneous, had poor adhesion and provided much less protection than the film formed by immersion. Hinton attributed these problems to the presence of small holes formed in the coating by evolving hydrogen, which was overcome by electrodeposition from an organic butylcellosolve solution containing 10,000 ppm $Ce(NO_3)_3$. This cathodic film with a network of cracks exhibited a five-fold improvement in corrosion resistance over that of the uncoated alloy, but was inferior to those coatings formed by the immersion process.

The possibility of obtaining a suitable cerium dip coating more quickly by utilizing an oxidizing agent has been explored. Wilson and Hinton developed a patented process to produce Ce(IV) coatings using hydrogen peroxide. This technique involved a simple addition of 1~5% $H_2O_2$ into a solution of 10,000 ppm $CeCl_3$ at 50° C. A yellowish coating was readily formed on aluminum alloys between 2 and 10 minutes. The main advantage of this process was that it did not require a cathodic potential to form a coating in a reasonable time. The coating exhibits good adhesion to the substrate and to paint films. Regarding its corrosion protection, however, this coating did not perform as well as the films made by the long-term immersion process. Scanning electron microscope characterizations revealed the existence of heavily cracked regions which are considerably greater than the average thickness of the film.

Another dip process involving cerium compounds was developed by Mansfeld et al. Aluminum alloy coupons were first boiled in $Ce(NO_3)_3$ for 2 hours, then boiled in $CeCl_3$ for another 2 hours. In the last step, an electrochemical treatment was applied by which the samples were polarized in deaerated 0.1 M $Na_2MoO_4$ at a potential of +500 mV vs. SCE for 2 hours. This process was successfully applied to the corrosion protection of aluminum alloy 6013-T6, which showed no signs of localized corrosion after 60 days' exposure to 0.5 M NaCl solution.

When this process was applied to aluminum alloys with higher alloy contents such as 7075-T6 and-2024-T3, less satisfactory results were obtained. Al 2024 alloys showed pitting after 1 day of exposure to the NaCl solution. Mansfeld et al. reported an improved process based on a pretreatment step. Prior to the cerium dip process, aluminum alloy 2024 or 7075 was polarized at −55mV (vs. SCE) in a solution containing 0.5 M $NaNO_3$ acidified to a pH of 1 using HCl, or dip in an acidic chromate solution following a 20 vol % HNO$_3$ solution immersion for 1 minute. The modified process was reported to improve the pitting resistance of both 2024 and 7075 aluminum alloys.

Stoffer et al. (U.S. Pat. No. 5,923,083) disclosed a process for the electrodeposition of Ce-based corrosion resistant coatings on Al and Al alloy substrates.

E-coating, or electrocoating, is typically a barrier-type coating process involving an electrolyte containing paint which is deposited on a substrate upon application of current. It has the advantage that it coats irregularly shaped objects. A disadvantage of existing e-coating processes is that once the coating is broken, chipped, or otherwise compromised, there are no corrosion inhibitors in the paint to leach out and protect metal exposed by the compromise.

SUMMARY OF THE INVENTION

It is an object of the invention, therefore, to provide a process for improving the corrosion resistance of metallic components; to provide such a process which employs a corrosion inhibitor which is compatible with and enhances performance of e-coat paints; to provide such process which combines the operations of depositing corrosion inhibitor and e-coat paint into a single operation; and to provide such a process with fewer health and environmental disadvantages.

The invention, therefore, is directed to a process for enhancing the corrosion resistance of a metallic component involving immersing an anode and a cathode in an electrolyte containing cerium ions and a paint emulsion and having a pH below about 8, and passing an electrical current through the electrolyte to facilitate deposition of a cerium-based coating and paint onto metallic component.

The invention is also directed to a process for enhancing the corrosion resistance of a metallic component involving immersing an anode and a cathode in an electrolyte containing 0.05 to 10 wt % of a cerium salt and a paint emulsion, and passing an electrical current through the electrolyte to facilitate deposition of a cerium-based coating and paint onto metallic component.

In another aspect the invention is directed to a process for enhancing the corrosion resistance of an metallic component involving immersing an anode and cathode in an electrolyte comprising a paint emulsion, at least about 0.05 wt % of a cerium salt, no more than about 10 wt % of said cerium salt, and water, and passing an electrical current through the electrolyte to deposit a coating having a cerium layer onto the cathode and a cerium-enhanced paint layer over the cerium layer, wherein chips, scratches, and other damage to the coating in service are protected against corrosion because cerium leaches from the cerium layer and from the cerium-enhanced paint layer to the chips, scratches, and other damage.

The invention is further directed to a process for applying corrosion inhibition as well as paint to a metallic component in a single operation. An electrical current is passed through an electrolyte in which are immersed an anode and the metallic component as a cathode, wherein the electrolyte has a pH of less than about 8 and contains water, a source of cerium ions, and a paint emulsion, thereby depositing a corrosion-inhibiting cerium layer onto the cathode and a cerium-enhanced paint layer over the cerium layer in a single operation.

The invention also involves a process for enhancing the corrosion resistance of a metallic component involving immersing the metallic component in an alkaline cleaning solution, deoxidizing the metallic component by immersion in an acidic deoxidation solution, immersing an anode and the metallic component as a cathode in an electrolyte containing from about 0.05 wt % to about 10 wt % of a cerium salt and a paint emulsion and having a pH below about 8, passing an electrical current through the electrolyte to facilitate deposition of a coating comprising a cerium-based layer and a paint layer onto the metallic component, and curing the coating by heating the component at a temperature between about 100° C. and about 210° C.

Other objects and features will be in part apparent and in part pointed out hereinafter.

DETAILED DESCRIPTION OF THIS INVENTION

Cerium (Ce) is a malleable, ductile metallic element having an atomic number of 58 and an atomic weight of 140.12. It is the most abundant of the rare earth metallic elements. Cerium possesses highly stable oxides, $CeO_2$ or $Ce_2O_3$, in the oxidation states of 3 and 4. Cerium ions are precipitated to form an oxide or mixed oxide/hydroxide adsorbed readily on the surface of $Al(OH)_3$ or $Al_2O_3$ to provide a $CeO_2$ or $CeO_x(OH)_y$ coating which provides extensive corrosion protection. A cerium-based coating is a coating formed by the precipitation of cerium salts onto a substrate. The preferred cerium-based coatings are cerium oxide and hydrated cerium oxide. The cerium-based coating of the invention enhances corrosion resistance by enhanced barrier protection and electrochemical protection. The coating has been discovered to deposit and adhere well to other metallic substrates such as steel and galvanized steel.

In accordance with this invention, a substrate is pretreated by cleaning and/or surface modification, such as deoxidizing. The pretreatment cleaning operation consists of optionally rinsing the component substrate with acetone followed by immersion in a cleaning solution of an alkaline cleaner in water. In one preferred application, the alkaline cleaner is Turco alkaline cleaner distributed under the trade name Turco NCLT available from Turco Products, Inc., a subsidiary of Elf Atochem, of Delaware, Ohio, in a concentration of 5% by weight in water. In one preferred embodiment, the component is immersed in this cleaning solution at between about 35° C. and about 60° C. for 5 to 15 minutes. In another preferred embodiment, the component is immersed in this solution at between about 38° C. and about 48° C. for about 5 to about 10 minutes. The component is then optionally rinsed with tap water followed by deionized water.

There is an optional pretreatment deoxidation operation. In one embodiment this involves immersion in a solution comprising 5% to 15% by volume nitric or sulfuric acid and 2.5 wt % Amchem #7, available from Amchem Products, Inc., a subsidiary of Henkel Surface Technologies, of Ambler, Pa., for between about 5 and 15 minutes followed by rinsing with distilled water. In general, the deoxidation solution contains between about 2 and about 2.5 wt % of Amchem #7 and an acid selected from among nitric (42° Be')/at 9 to 14 volume % or sulfuric [66° Be']/at 5 volume %. The purpose of this treatment is to provide a uniformly cleaned and deoxidized surface.

Rather than or in addition to deoxidation, the surface may otherwise be modified by a treatment which changes oxides on the surface to another phase, or otherwise changes the surface characteristics to catalyze and/or otherwise enhance adhesion.

After pretreatment the component is subjected to e-coating. The e-coat coating medium is an emulsion of organic resins, i.e., paint, and de-ionized water, which is in a stable condition. The e-coat solution also comprises some solvent and some ionic components. When a direct voltage is applied across two immersed electrodes, the passage of current is accompanied by electrolysis of water. This results in oxygen gas being liberated at the anode (positive electrode) and hydrogen gas being liberated at the cathode (negative electrode). The liberation of these gases disturbs the hydrogen ion equilibrium in the water immediately surrounding the electrodes. This results in a corresponding pH change, modifying the paint components of the solution. These components coagulate, i.e., deposit, onto the appropriate electrode.

In this particular application the component substrate serves as the cathode and is immersed in a bath containing the paint emulsion. Current is passed through the substrate and the emulsion, generating conditions which allow the paint particles in the emulsion that are in contact with the substrate to adhere to the substrate surface, forming an electrically insulating layer. This insulation inhibits the passage of further electrical current to areas coated by the paint, effectively directing it to areas not yet coated by the paint. As such, a paint coating of consistent thickness is formed even in remote and recessed areas of substrates of intricate shape.

The preferred form of the cerium present is a soluble or partially soluble salt, but the form is not limited to these. A quantity of cerium salt, preferably a non-chloride cerium salt, more preferably cerium nitrate, $Ce(NO_3)_3$, is incorporated into the coating bath to provide substantial corrosion resistance to the substrate beyond that resistance provided by the paint composition itself. In one embodiment this cerium salt is $Ce(NO_3)_3 \cdot 6H_2O$. Cerium chloride is avoided to avoid release of chlorine gas during electrolysis. Cerium compounds are dispersed throughout the paint particles to provide this protection. Chemical analysis of the interface between the aluminum substrate and the e-coat reveals that a Ce-based protective layer preferentially deposits on the substrate upon initial application of potential and prior to substantial deposition of paint, thereby providing a corrosion-resistant underlayer and/or transition layer between the substrate and the paint.

In the preferred embodiment, the cerium salt, preferably nitrate, constitutes at least about 0.05 wt % of the bath and up to about 10 wt % of the bath, and more preferably from about 0.05 wt % to about 10 wt % of the bath. In one preferred embodiment, the cerium nitrate constitutes from about 0.05 to about 5 wt %. And in one preferred embodiment, about 0.3 wt % of the bath.

The bath contains an e-coat resin and an e-coat paste of the type commercially available from major paint manufacturers.

The pH of the bath is preferably maintained below about 8. Above 8 the solubility of the cerium suffers and the system begins to switch from cathodic to anodic deposition. In one preferred embodiment, the pH is in the range of about 5 to about 8, more preferably from about 6 to about 8, most preferably from about 6 to about 7.

One preferred bath contains the following, by weight:
38 to 41% e-coat-resin
11 to 12% e-coat paste
0.05 to 10% cerium nitrate
47 wt % to 50 wt % deionized water
with a pH between 5 and 8.

The e-coat bath temperature is maintained at a temperature from about 25° C. to about 40° C., preferably from about 30° C. to about 35° C., more preferably about 32° C., with or without agitation.

A voltage is applied to the electrolytic cell in the range of from about 30 V to about 225 V, preferably from about 175 V to about 210 V, most preferably about 200 V. The current is in a range consistent with the applied potential and operating parameters. Deposition time is from about 30 seconds to about 150 seconds, preferably from about 90 seconds to about 130 seconds, most preferably about 120 seconds.

After coating, the substrate is removed from the coating bath, rinsed, preferably with de-ionized water, and dried, preferably with compressed air. The product is then cured in an oven, preferably at about 100° C. to about 210° C., more preferably at about 150° C. to about 180° C., and in one preferred embodiment about 176° C., depending on the specifications of the e-coat resin, for preferably about 15 to 30 minutes.

One advantage of the process of the invention is that the Ce-based corrosion inhibitor is incorporated into the deposited paint film. This Ce-based inhibitor in the paint film provides better corrosion protection than some other inhibitors, and does not prematurely de-stabilize the paint as do other inhibitors. This Ce-based inhibitor also has the significant advantage that it appears to leach out of the deposited film to protect the metal substrate.

A second advantage is that a thin, Ce-based protective underlayer or transition layer or both are believed to be formed between the substrate and the deposited paint film. Previously it had been necessary to perform a separate pre-treatment step, such as with phosphates or chromates, to provide pre-treatment protective layer under the final e-coat paint film. With this process, chromate and phosphate pre-treatments for corrosion protection can be eliminated, as corrosion inhibitor is imparted in the same step as e-coating with the paint. This therefore permits imparting the dual protection of a corrosion inhibitor and e-coat paint in one step rather than two. Toxic chromates are eliminated.

The choice of soluble Ce salt allows for more dissociation and cathodic precipitation. The Ce salts and especially cerium nitrate are easy to incorporate into cathodic e-coat formulations. The Ce in the paint has been shown to leach out and protect by passivation areas of the substrate of metal exposed by damage during service.

The process of the invention can be applied with or without a pretreatment coating of cerium or other, e.g., chromate, conversion coating. When with a conversion coating, cerium from within the deposited paint and above described underlayer and/or transition layer feeds into the conversion coating to achieve ongoing passivation.

The final thickness of the coating is at least about 0.2 mils, preferably at least about 0.3 mils (0.008 mm), and in many preferred applications at least about 0.7 mils (0.018 mm).

The thickness is usually less than about 3 mils (0.08 mm), and less than about 1.5 mils (0.04 mm) for many applications.

EXAMPLES

Figure 1:
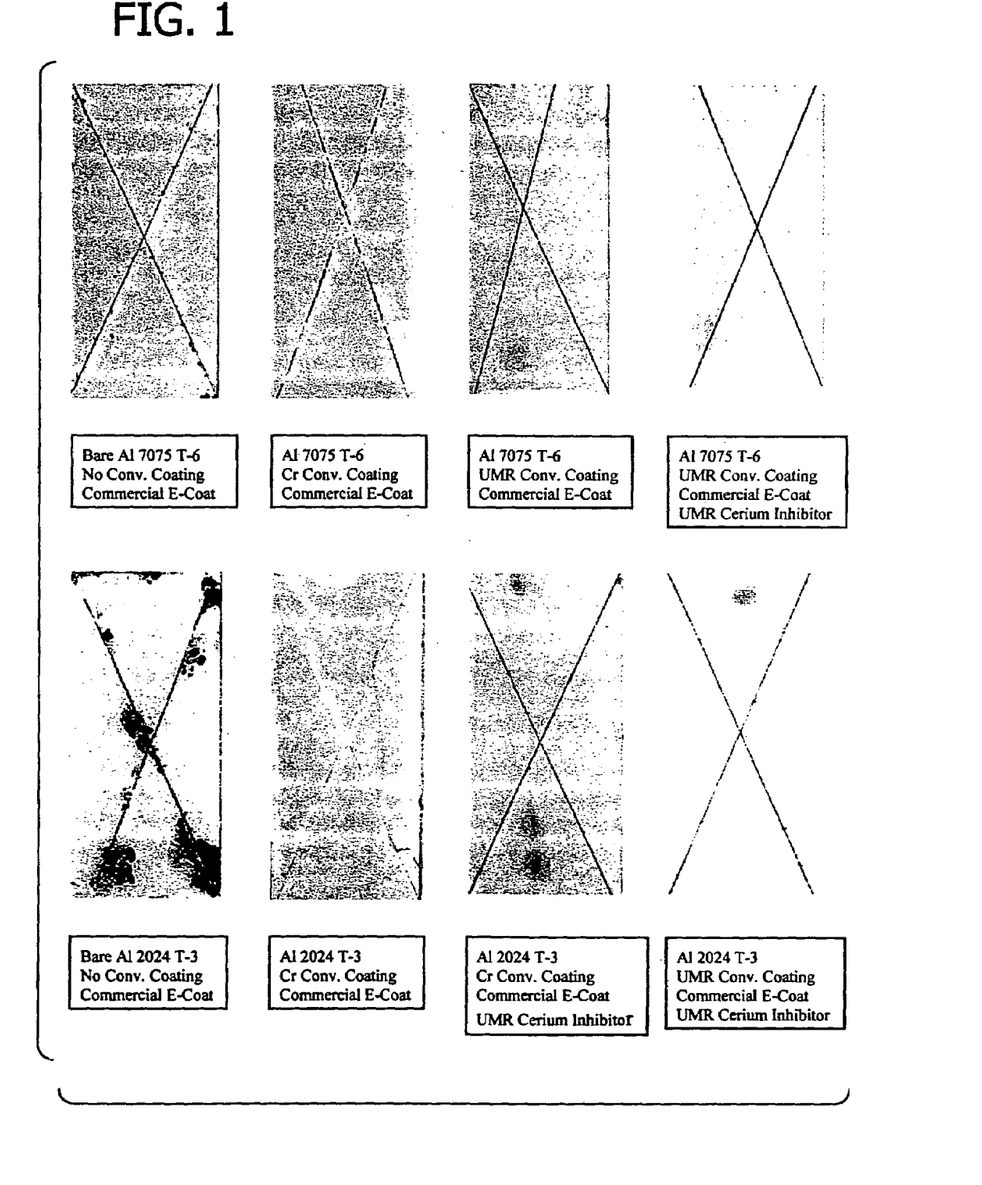
FIGS. 1 and 2 are photographs comparing the components treated according to the invention with components treated otherwise.
Figure 2:
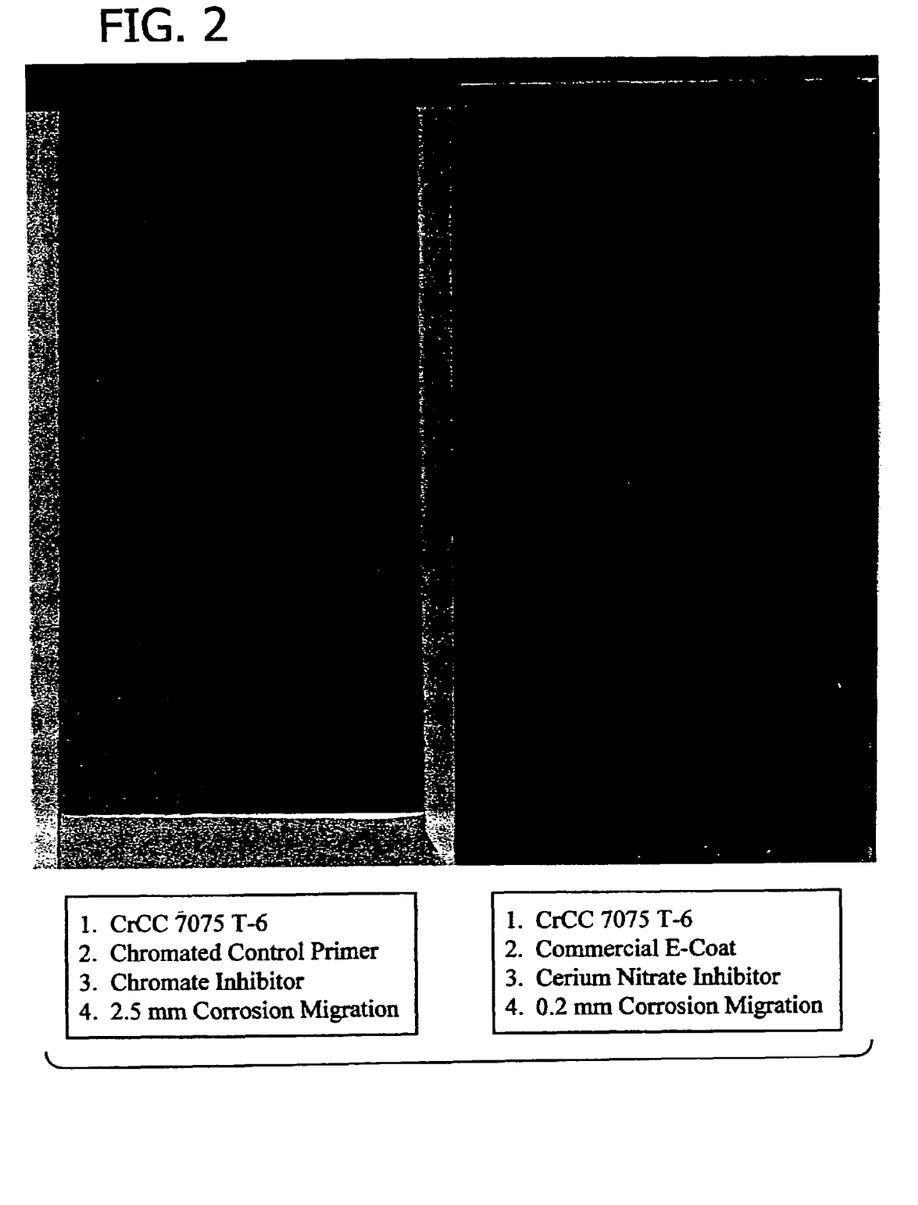
Figure 3A:
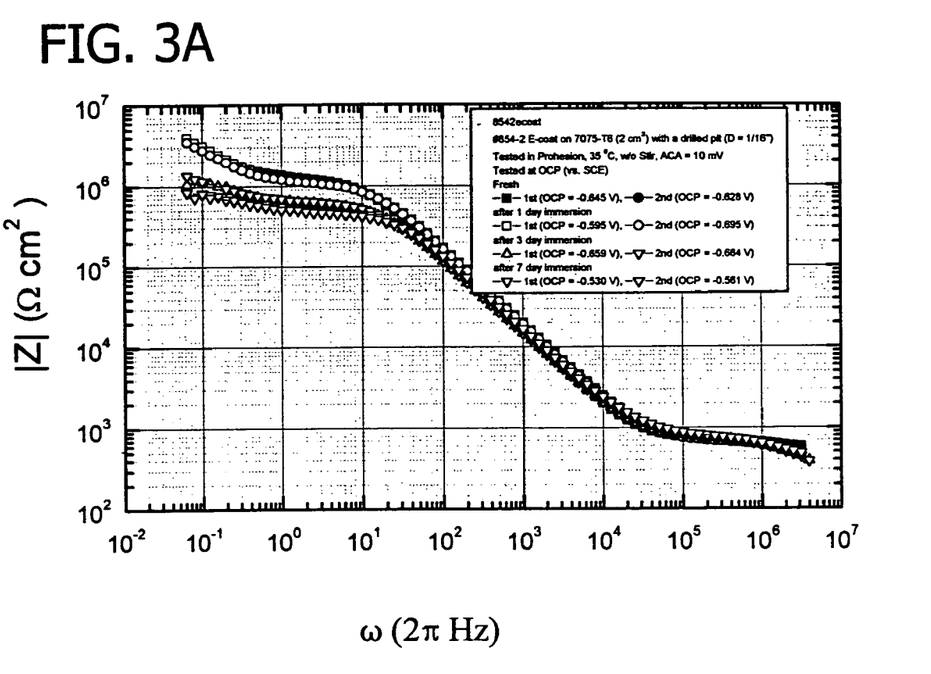
FIG. 3 contains plots of electrochemical impedance spectroscopy for components treated according to the invention and components treated otherwise.
Figure 3B:
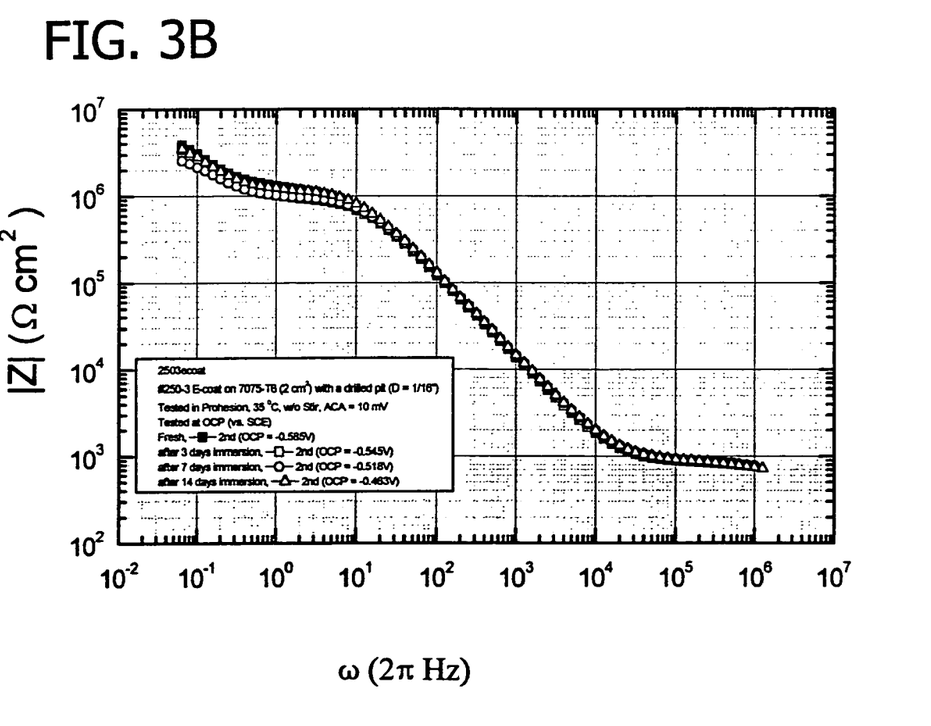
Figure 3C:
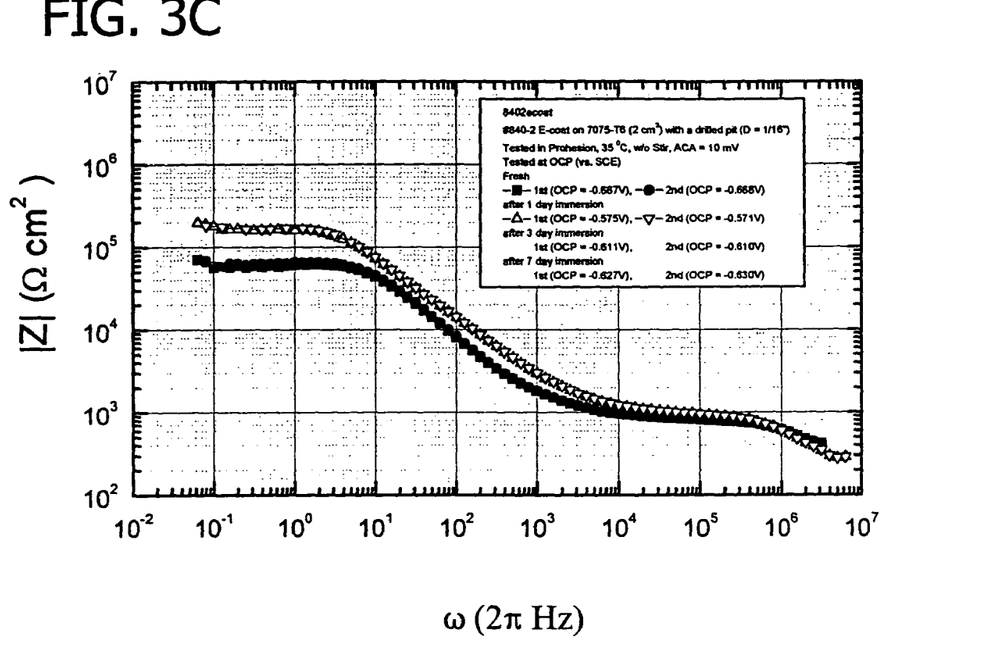
Figure 3D:
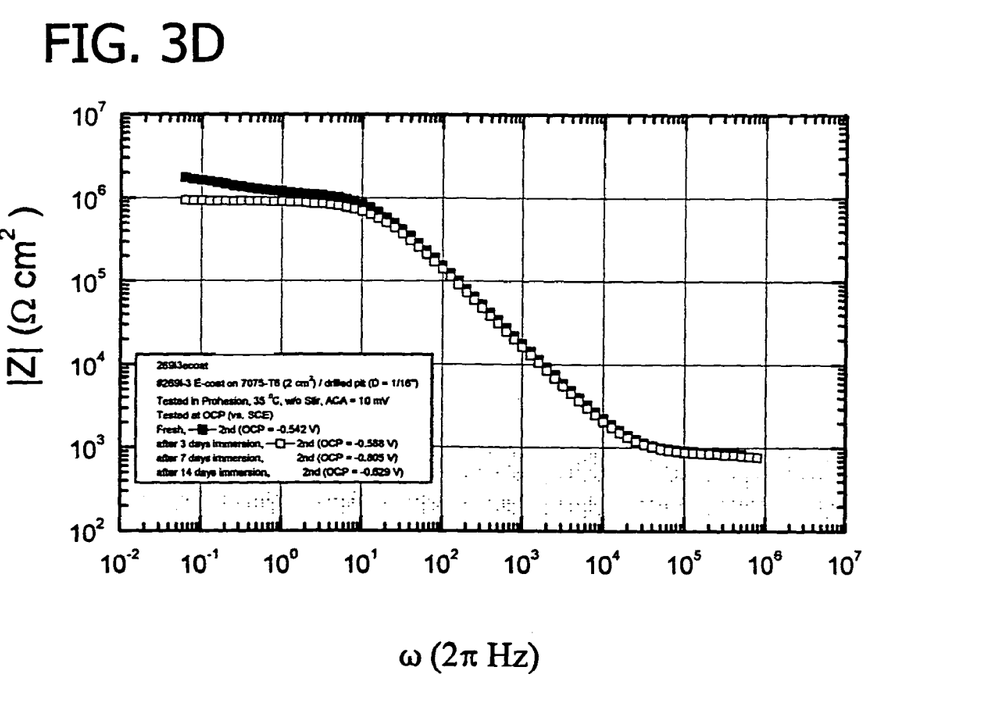
Figure 4:
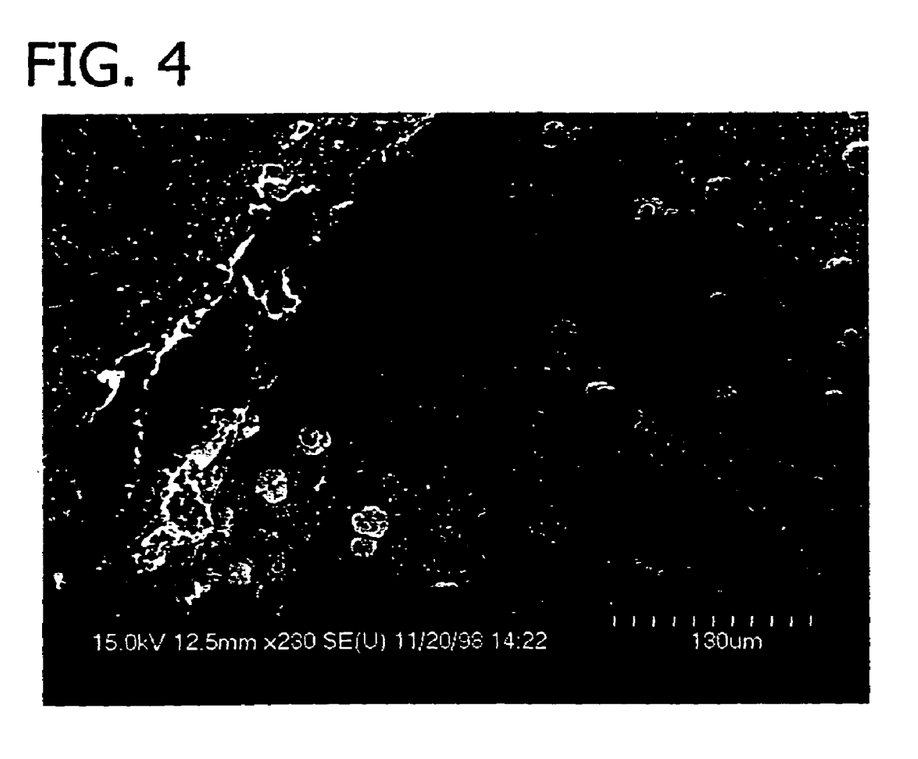
FIG. 4 is a scanning electron microscopy photomicrograph of a component treated according to the invention.
Figure 5:
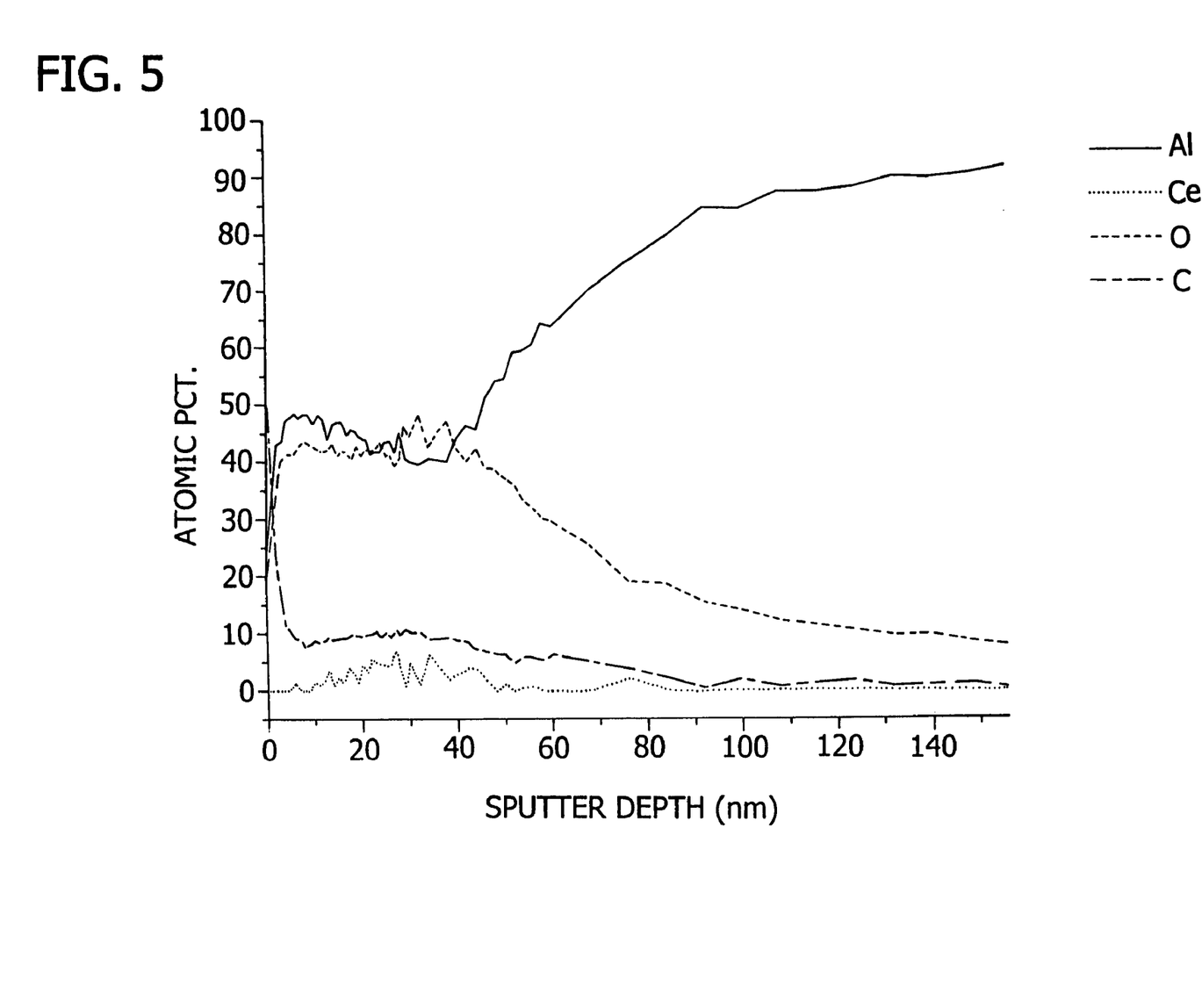
FIG. 5 presents auger elemental analysis of a component treated according to the invention.
Figure 6:
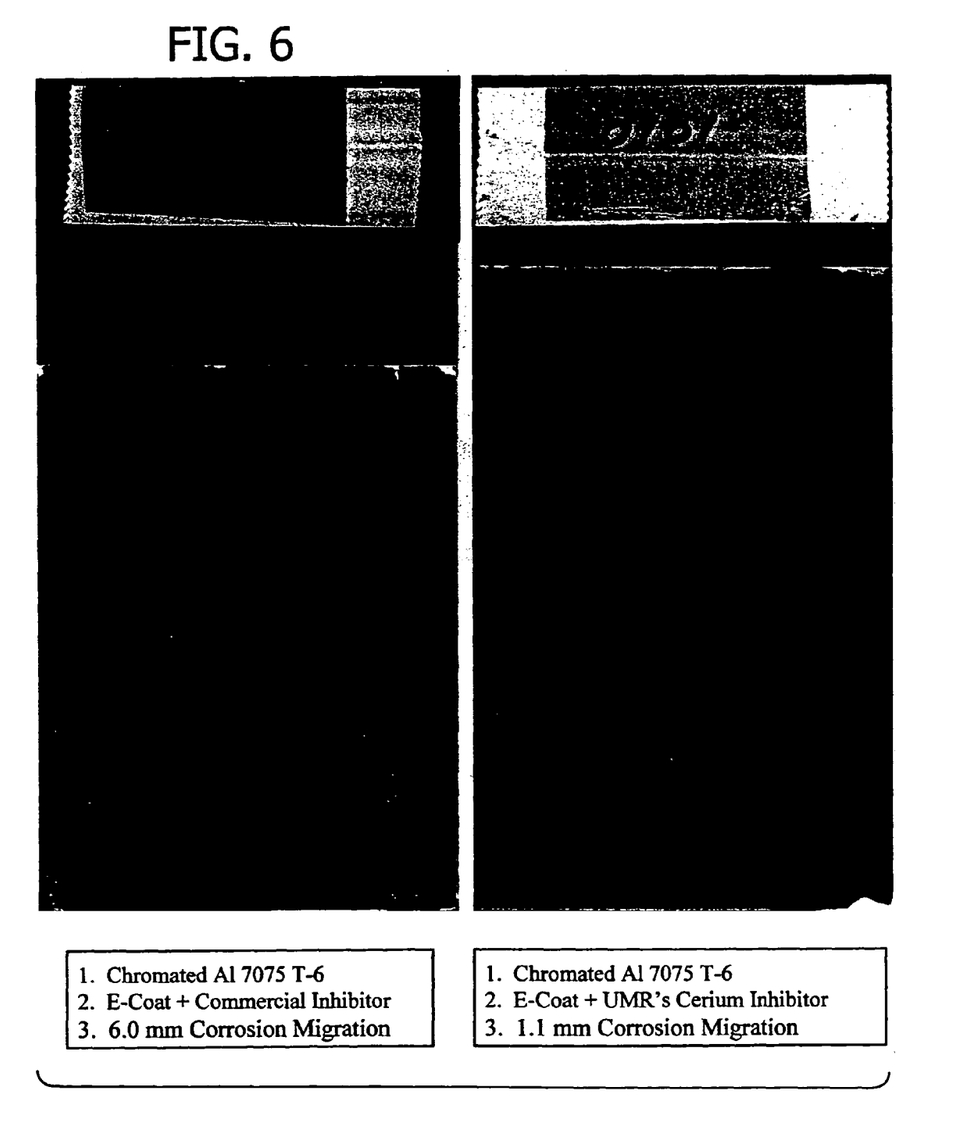
FIG. 6 presents photographs comparing the components treated according to the invention with components treated otherwise.

Samples were coated according to the process of the invention and tested. Pictures of samples tested using ASTM B-117 neutral salt spray and $SO_2$ are presented in FIGS. 1 and 2. In FIG. 1, the photographs with the legend "UMR Cerium Inhibitor" are of samples prepared according to the invention, the others are not. In FIG. 2, the photograph on the right with the legend "Cerium Nitrate Inhibitor" is of the invention, the photograph on the left is not. These show that the cerium nitrate inhibitor (UMR Cerium Inhibitor) improves the corrosion resistance of the coating. Electrochemical Impedance Spectroscopy (EIS) data are presented in FIG. 3. Plot A and C are of samples upon conventional application of a commercial e-coat paint; plot A being with an underlying Cr conversion coating; plot C being on bare metal. Plots B and D are of samples upon application of a commercial e-coat paint with the cerium corrosion inhibitor of the invention; plot B being with an underlying Cr conversion coating; plot D being on bare metal. These show that with inclusion of cerium nitrate into the e-coat paint formulation, impedance remains high and capacitated. FIG. 4 is a Scanning Electron Microscope (SEM) picture of an artificially drilled pit after soak for one year in a corrosion test solution, revealing the morphology of an area compromised by mechanical damage and corrosion. The nodules were shown by EDS elemental analysis to comprise mainly cerium. FIG. 5 presents auger elemental analysis of an e-coated, bare Al 7075 T-6 panel with the coating removed. The plot shows a thin cerium-based layer between the deposited paint and the bulk aluminum substrate. FIG. 6 shows two e-coat primer formulations after testing with a cyclic corrosion test solution, one applied with a commercial corrosion inhibitor and one applied with the cerium inhibitor of the invention (UMR's cerium inhibitor). The pictures were taken after the primer was removed to display the underlying surface. The substrate treated according to the invention demonstrated greater corrosion protection.

Although specific examples of the present invention and its application are set forth herein, it is not intended that they are exhaustive or limiting of the invention. These illustrations and explanations are intended to acquaint others skilled in the art with the invention, its principles, and its practical application, so that others skilled in the art may adapt and apply the invention in its numerous forms, as may be best suited to the requirements of a particular use.

The invention claimed is:

1. A process for enhancing the corrosion resistance of a metallic component manufactured from a material selected from the group consisting of aluminum and aluminum alloy, the process comprising;
   immersing an anode and the metallic component as a cathode in an electrolyte, wherein the electrolyte has a pH in the range of about 5 to about 8 and consists essentially of:
      between about 0.05 wt % and about 10 wt % of a cerium salt;
      an e-coat resin;
      an e-coat paste; and
      deionized water; and
   passing an electrical current through the electrolyte to facilitate deposition of a cerium-based coating and paint on said metallic component.

2. The process of claim 1 wherein said cerium salt is cerium nitrate.

3. The process of claim 1 wherein the electrolyte consists essentially of the following, by weight;
   38 to 41% e-coat paint resin;
   11 to 12% e-coat paste;
   0.05 to 5% cerium nitrate; and
   47 to 50% deionized water.

4. The process of claim 1 wherein the electrolyte consists of;
   between about 0.05 wt % and about 10 wt % of a cerium salt;
   an e-coat resin;
   an e-coat paste; and
   deionized water.

5. The process of claim 1 wherein the electrolyte consists of;
   38 to 41% e-coat paint resin;
   11 to 12% e-coat paste;
   0.05 to 5% cerium nitrate; and
   47 to 50% deionized water.

6. The process of claim 1 wherein said cerium-based coating is a $CeO_2$ (cerium oxide) or $CeO_x(OH)_y$ (hydrated cerium oxide).

7. A process for enhancing the corrosion resistance of a metallic component manufactured from a material selected from the group consisting of aluminum and aluminum alloy, the process comprising;
   immersing the metallic component in an alkaline cleaning solution;
   deoxidizing the metallic component by immersion in an acidic deoxidation solution;
   immersing an anode and the metallic component as a cathode in an electrolyte, wherein the electrolyte has a pH in the range of about 5 to about 8 and consists essentially of;
      between about 0.05 wt % and about 10 wt % of a cerium salt;
      an e-coat resin;
      an e-coat paste; and
      deionized water;
   passing an electrical current through the electrolyte to facilitate deposition of a coating comprising a cerium-based layer and a paint layer onto said metallic component; and
   curing the coating by heating the component at a temperature between about 100° C. and about 210° C.

8. The process of claim 7 comprising;
   rinsing the metallic component with acetone;
   immersing the metallic component in said alkaline cleaning solution at a temperature between about 38° C. and about 48° C. for about 5 to about 10 minutes;
   deoxidizing the metallic component by immersion in said acidic deoxidation solution for between about 5 and about 15 minutes, wherein said solution comprises one of nitric acid or sulfuric acid;
   wherein said electrolyte consists essentially of;
      from about 0.05 wt % to about 10 wt % of cerium nitrate as said cerium salt;
      the e-coat resin;
      the e-coat paste; and
      deionized water;
   passing said electrical current through the electrolyte for between about 90 and 130 seconds at from about 175 V to about 210 V; and
   curing the coating by heating the component at a temperature between about 150° C. and about 180° C.

9. The process of claim 7 wherein the electrolyte consists of;
between about 0.05 wt % and about 10 wt % of a cerium salt;
an e-coat resin;
an e-coat paste; and
deionized water.

10. The process of claim 7 wherein the electrolyte consists of;
38 to 41% e-coat paint resin;
11 to 12% e-coat paste;
0.05 to 5% cerium nitrate;
47 to 50% deionized water.

11. The process of claim 7 wherein said cerium-based layer is a $CeO_2$ (cerium oxide) or $CeO_x(OH)_y$ (hydrated cerium oxide).

* * * * *